Figure 3:
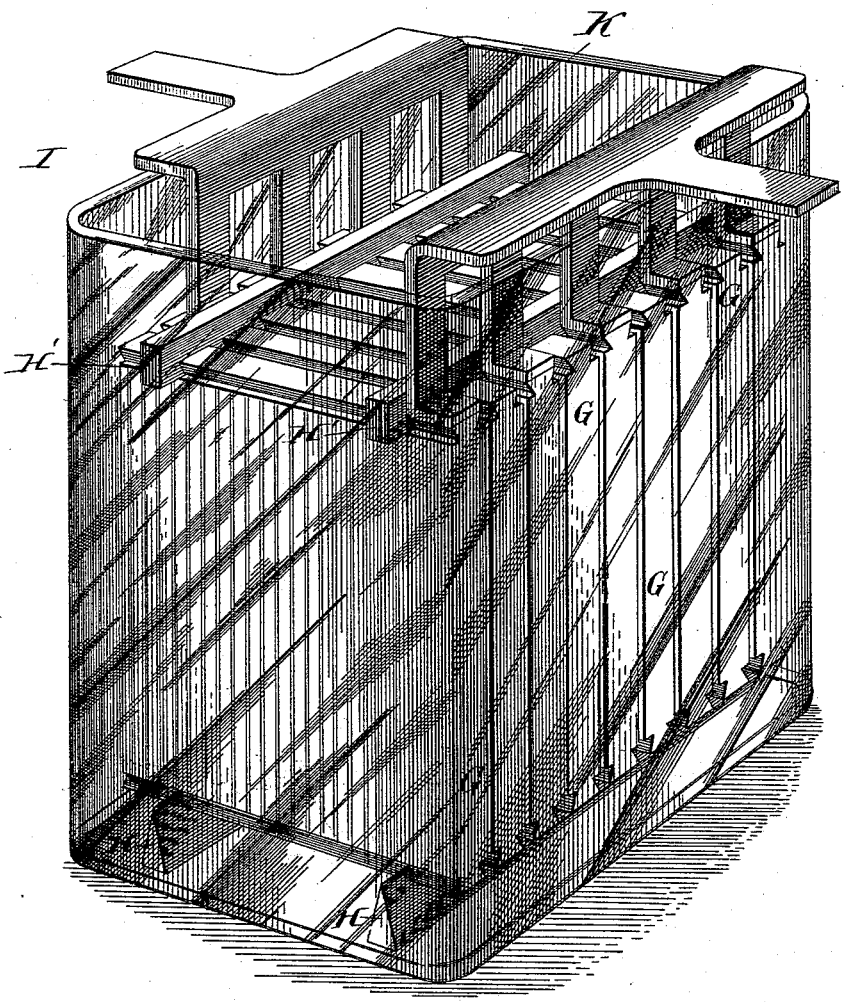

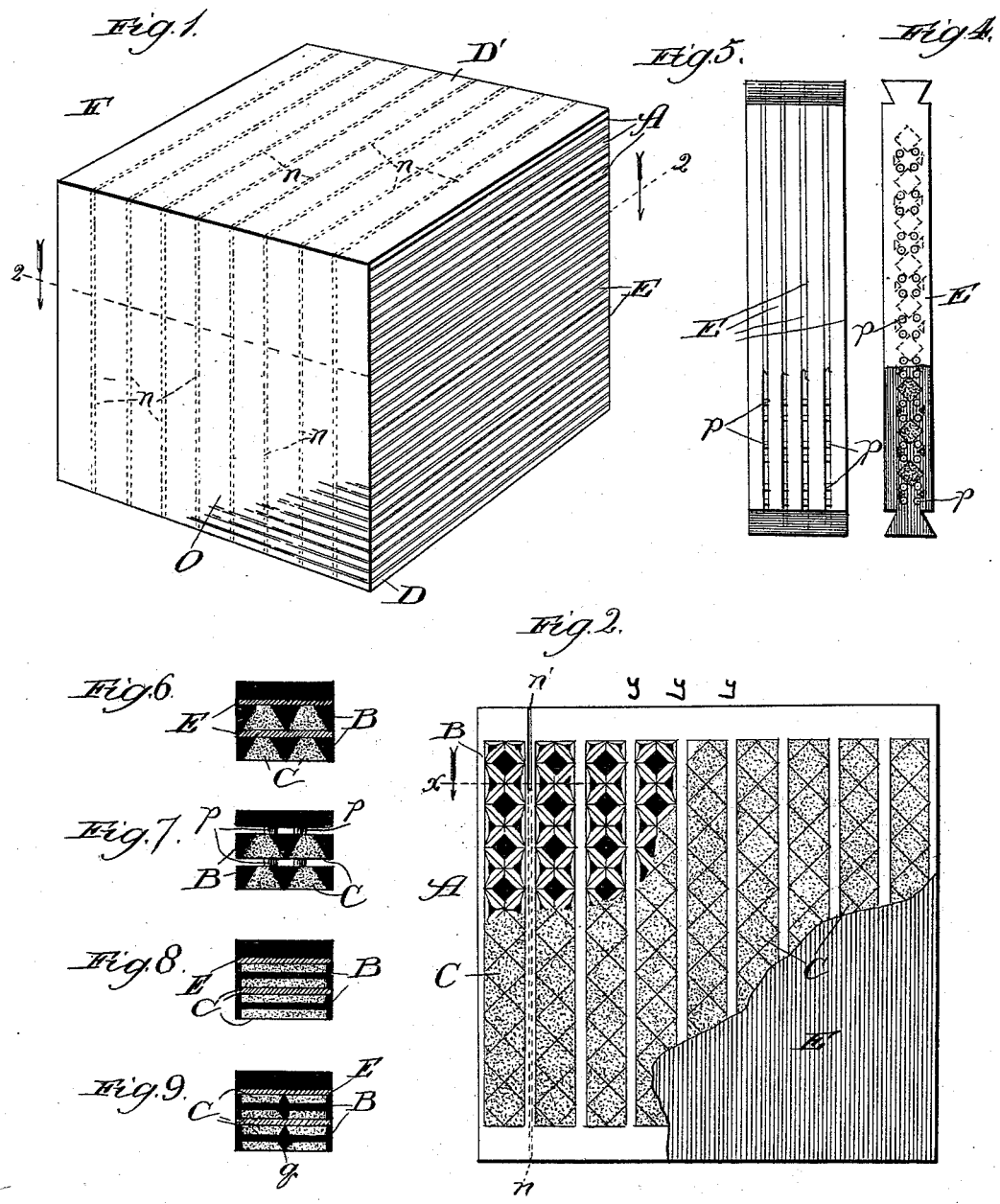

(No Model.) 2 Sheets—Sheet 2.
J. F. MEHREN.
SECONDARY ELECTRIC BATTERY.

No. 439,301. Patented Oct. 28, 1890.

Witnesses:

Inventor:
Jacob F. Mehren,
By Dyrenforth and Dyrenforth
Attys.

UNITED STATES PATENT OFFICE.

JACOB F. MEHREN, OF CHICAGO, ILLINOIS.

SECONDARY ELECTRIC BATTERY.

SPECIFICATION forming part of Letters Patent No. 439,301, dated October 28, 1890.

Application filed January 20, 1890. Serial No. 337,435. (No model.)

*To all whom it may concern:*

Be it known that I, JACOB F. MEHREN, a citizen of the United States, residing at Chicago, in the county of Cook and State of Illinois, have invented a new and useful Improvement in Secondary Electric Batteries, of which the following is a specification.

My invention relates more especially to the improvement of secondary batteries in which the elements employed for immersion in the electrolytic fluid comprise metal (ordinarily lead) plates having applied to them and forming supports for the so-called "active material."

The common manner of producing an element for the class of batteries referred to is to employ a metal plate adapted by its construction (as by means of numerous perforations through it, grooves, channels, or otherwise) to constitute a "support" for the active material, apply the active material to the support, and, finally, "form" the "plate" so produced. In the battery in which the elements produced in the manner thus generically described are employed each support provided with its active material and duly formed constitutes a plate or element, and the battery is produced by opposing such plates in the electrolytic fluid face to face or flatwise to each other, the surface of the element being, in the main, at least, the active material on the plate-surface so opposed. This manner of constructing a secondary-battery element renders it a matter of difficulty to prevent dislodgement and falling from its supports of the active material in quantities, which in a comparatively short time occasion great impairment of the battery; and, furthermore and particularly, the capacity of the plate or element is practically limited according to the extent of lateral surface exposed to electrolytic action.

The object of my improvement is to provide a secondary-battery plate or element in which the active material shall not be exposed at the actual (or lateral) surfaces of the plate, but shall be practically enveloped by or shall constitute a filling inside the plate. A further object is to provide by the construction an extent of surface for the electrolytic action on each plate materially greater than its lateral surface area; and a still further object of my invention is to provide an improved method of producing my new battery-plate.

In the accompanying drawings, Figure 1 is a perspective view in the nature of a diagram to illustrate in detail the preferred manner of procedure to produce my improved battery-plates, and indicating a cubic pile of sheets formed of metal, (lead,) each defined into a series of connected strips adapted to receive and support the active material, the top and bottom metal plates of the pile being plain or unbroken, and a sheet of material, preferably absorbent—such as blotting or asbestus paper—interposed between each contiguous pair of the metal sheets in the pile. Fig. 2 is a section taken on the line 2 2 of Fig. 1, viewed in the direction of the arrows, and having the surface broken to represent near the lower right-hand corner the imposed sheet of absorbent or other material; near the diagonally-opposite corner the series of metallic strips of which the metallic sheet for supporting the active material is formed, and between the two the active material applied to the perforations in the metallic strips. Fig. 3 is a perspective view of a secondary battery involving my improvement. Fig. 4 represents in end elevation, partly broken, a transverse vertical section of one of my improved battery plates or elements. Fig. 5 is a side elevation of the representation in Fig. 4. Fig. 6 represents a sectional view of my improved plate or element, the section being taken on the line $x$ of Fig. 2 and viewed in the direction of the arrow; and Figs. 7, 8, and 9 are similar views showing modifications.

The term "active material" herein employed is intended to include the substance applied to the support and rendered active by the "forming" both before and after the forming of a plate has been accomplished; or, in other words, it is intended to include the active material as such and the material before it has been rendered active.

Following is a detailed description of the procedure I prefer to observe in producing my improved secondary battery-plate:

I provide a number of sheets of lead A, (though I do not limit my invention to the use of this particular metal,) of rectangular shape and divisionally defined at marginal portions $y$, as best indicated in Fig. 2, into strips perforated throughout, either by the angular perforations illustrated and which taper from the front to the rear surface of the strip (see Figs. 6 and 7) or otherwise; or the strips B may be imperforate and otherwise adapted to support the active material C, as by means of the I form or channeled form of strip or plate illustrated in Fig. 8, or by the same form provided along the center of each channel with the V-shaped ledge $q$. (Shown in Fig. 9.)

Whatever the form of the strip B to adapt it for supporting the active material C, it should be provided on one surface, as shown, with studs $p$ for spacing if the interposed sheets referred to should be washed out, as they will be, if composed of blotting or analogous paper.

To produce the pile F, (illustrated in Fig. 1,) a blank sheet of lead D of the dimensions of each sheet A is used for a foundation. Upon this may be imposed a sheet E of blotting or asbestus paper or other suitable material. Then a sheet A, composed of the connected lead strips B, is imposed on the sheet E, and the active material C applied, preferably in the form of a dry powder, in order to insure thorough filling of the perforations. Another of the sheets E is then applied, and to this another sectional lead sheet A, which is then provided with the active material, and so on until a pile of desired size is produced. The final layer for the top of the pile is a blank sheet D' of lead.

It may here be stated that the active material may be applied either dry or wet. If blotting-paper or analogous disintegrable material be employed, it will and need serve only temporarily, since, when the element containing it is immersed in the electrolytic fluid, the paper disintegrates and washes out from between the strips B. In that case the studs $p$ are required to space the strips B and maintain them apart against the action of expansion; but otherwise the studs may be dispensed with.

When the pile F has been produced, the edges of the sheets A at one or each of the sides $o$ (only one of which sides, however, is shown, owing to the nature of the view in Fig. 1) of the pile are joined together metallically by burning or melting to render them continuous. The pile is then ready to be cut into plates G, Fig. 3, which is readily done by means of a gang-saw caused to perform the cutting between the strips or sections B of the pile of sheets A at the broken lines $n$ in Fig. 1, and as indicated at $n'$ in Fig. 2. Each plate G produced by the cutting thus comprises a series of metal strips or plates B, each supporting active material and metallically connected together at their upper and lower ends with their flat sides facing each other and spaced by the studs $p$ (if employed) and interposed absorbent material E. Of course when both studs $p$ and sheets of blotting-paper E are used the latter should be provided with perforations to coincide with and fit over the former.

The battery I, Fig. 3, is made up of any suitable number of the plates G, immersed in series in the electrolyte contained in a cell K, formed of any suitable material, but shown as of glass, more particularly to permit convenient representation of its contents, and each plate in a series of the plates constituting a positive element is placed between two plates of the series constituting a negative element, the latter being shown electrically connected by suitable means at the right-hand side in Fig. 3 and the former in a similar manner at the opposite side.

To support the plates G, I prefer to dovetail them, as shown, along their upper and lower ends, (or where they are joined by the melting described in connection with the formation of the pile F,) and thereby adapt them to fit into bars H and H', respectively, at their upper and lower ends, the bars being formed of non-conducting material (as hard rubber) and provided each with dovetailed recesses, as shown, to receive the dovetailed ends of the plates G. The lower bar H should be V-shaped longitudinally in order that any foreign substance that may enter the cell shall not lodge upon the bar, but fall to the bottom of the cell.

The term "dovetail" herein employed to designate the kind of joint for supporting the plates G is not intended as a limitation to the spread pigeon's tail form shown, but to include any analogous form of the joint involving a tenon confined in a suitably-shaped groove.

My improved plate G may of course be produced in a manner differing as to details of procedure from that described, though the latter is believed to be the most desirable. For example, if the plate is to comprise a series of single strips B, as shown, provided with the active material, and the other features of the construction, if employed, each plate G may be built by itself instead of building a number thereof in a pile F and afterward severing the pile into plates. Obviously, furthermore, the strips B may be of any desired dimensions, thus comprising, if desired, each a full sheet A.

From the foregoing description of my improved plate it will be seen that it affords an exceptionally large extent of surface for the electrolytic action, since the latter takes place from the center of each support B toward the lateral edges thereof.

The supporting of the plates G, as shown in the cell K at the top and bottom only by the bars H and H', whereby unobstructed and readily-accessible spaces are afforded between the plates is also an important feature of my improvement, and the active material not being exposed at the lateral surfaces of the plates, which is characteristic thereof, it cannot if dislodged, owing to my improved construction, fall between opposing plates or plates of different polarity. Besides by my construction expansion is enabled to take place longitudinally of the plate, thereby avoiding "buckling."

What I claim as new, and desire to secure by Letters Patent, is—

1. A plate or element for a secondary battery, having a series of perforated supports B for the active material integrally united, the external side surfaces of the plate being formed of the edges of the supports, substantially as described.

2. A plate or element for a secondary battery, having a series of perforated supports B, integrally united flatwise, the external side surfaces of the plate being formed of the lateral edges of the supports, and active material C in the perforations of the supports, substantially as described.

3. A plate or element for a secondary battery, having a series of supports B, metallically joined flatwise together, and active material C and absorbent material E between the pairs of the said supports, the lateral edges of the supports and absorbent material forming the sides of the plate, substantially as described.

4. A plate or element for a secondary battery, having a series of supports B, each provided on one side with studs $p$ and metallically joined together with the studded side of each adjacent to the unstudded side of another, the sides of the plate being formed of the lateral edges of the supports, and active material C in the perforations of the supports, substantially as described.

5. A plate or element for a secondary battery, having a series of perforated supports B, each provided on one side with studs $p$ and metallically joined together with the studded side of each adjacent to the unstudded side of another, active material C in the perforations of the supports, and absorbent material E between the pairs of the said supports, the lateral edges of the supports and absorbent material forming the sides of the plate, substantially as described.

6. A plate or element for a secondary battery, comprising a series of perforated supports B, each provided on one side with studs $p$ and metallically joined together at their upper and lower ends, the joining medium at each end of the plate being dovetailed longitudinally, blank metal ends for the plate, active material C in the perforations of the supports, and absorbent material E between the pairs of the said supports and blanks, the lateral edges of the supports, absorbent material, and blank ends forming the sides of the plate, substantially as described.

7. A secondary electric battery I, comprising a cell K for the electrolytic fluid, a series of plates or elements G in the cell, comprising each a series of supports B, metallically joined at their upper and lower ends and having the joining medium dovetailed longitudinally, and active material C, and absorbent material E between the pairs of supports, the lateral edges of the supports and absorbent material forming the sides of the plate, bars H and H' for the lower and upper ends of the plates or elements G, the former being V-shaped, and dovetailed recesses in the said bars, substantially as described.

8. The method of producing secondary-battery plates, which consists in piling flatwise one upon another sheets A of connected metal strips B, applying to each sheet as it is laid active material C, and uniting the said sheets metallically on two sides of the pile, substantially as described.

9. The method of producing secondary-battery plates G, which consists in piling flatwise one upon another sheets A of connected metal strips B, applying to each sheet as it is laid active material C, uniting the said sheets metallically, and severing the pile so formed between the piles of strips B, substantially as described.

10. The method of producing secondary-battery plates G, which consists in piling flatwise one upon another sheets A of connected metal strips B, applying to each sheet as it is laid active material C and a sheet of absorbent material E, uniting the sheets A metallically, and severing the pile so formed between the piles of strips B, substantially as described.

11. The method of producing secondary-battery plates G, which consists in piling flatwise one upon another between metal blanks D and D' sheets A of connected metal strips B, applying to each sheet as it is laid active material C, uniting the said sheets and blanks metallically, severing the pile so formed between the piles of strips B, and dovetailing the plates along the metallic connecting medium of the strips B, substantially as described.

JACOB F. MEHREN.

In presence of—
JULIUS W. DYRENFORTH,
M. J. FROST.